(No Model.)
J. MOSES.
WAGON RUNNING GEAR.
No. 306,852. Patented Oct. 21, 1884.
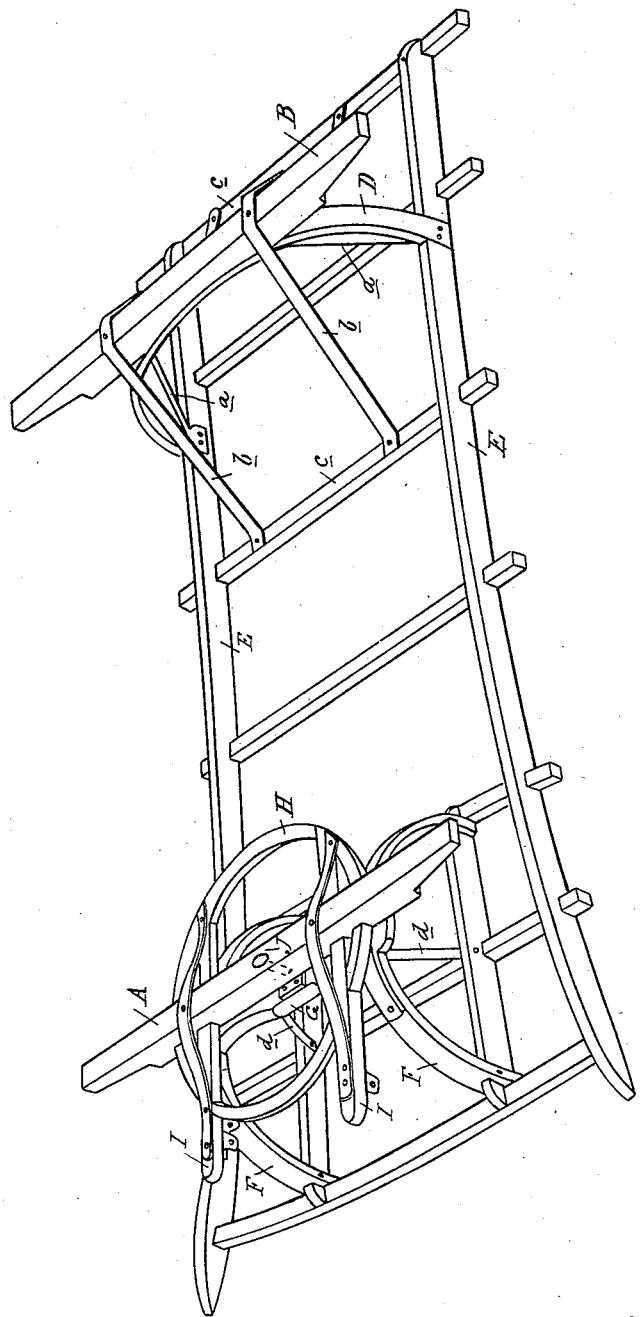
Attest
J. Paul Mayer
Charles J. Hunt
Inventor
Joseph Moses
By Thos. S. Sprague
Atty

United States Patent Office.

JOSEPH MOSES, OF LAPEER, MICHIGAN.

WAGON RUNNING-GEAR.

SPECIFICATION forming part of Letters Patent No. 306,852, dated October 21, 1884.

Application filed April 3, 1884. (No model.)

*To all whom it may concern:*

Be it known that I, JOSEPH MOSES, of Lapeer, in the county of Lapeer and State of Michigan, have invented new and useful Improvements in Wagons; and I do hereby declare that the following is a full, clear, and exact description thereof, reference being had to the accompanying drawings, which form a part of this specification.

This invention relates to certain new and useful improvements in wagons, being an improvement on the wagon described in Letters Patent No. 281,913, issued to me, and dated July 24, 1883.

The invention consists in the peculiar construction, arrangement, and various combinations of the parts, all as more fully hereinafter described.

In the accompanying drawing, which forms a part of this specification, my invention is shown in perspective, looking at the bottom from below, and A B represent the front and rear axles, respectively. Superimposed upon the rear axle, and secured thereto by means of the tie-truss braces $b$, the ends of which are secured to the cross-bars $c$ of the bed-frame of the wagon, and by means of bolts passing through such braces, the axle, and the bolster, is the C-shaped bolster D, the parts being strengthened by the braces $a$. The front end of the bed-frame is wider than the central or rear sections thereof, as shown, by bending outwardly the front ends of the side bars, E, of the bed, and securing them in this position by proper cross-girts. To these cross-girts are rigidly secured the V-shaped bearing-frames F, which serve the place of bolsters, and which are connected together at their lowest points by the sway-bar G, the parts being strengthened by the braces $d$.

H is the circle or so-called "fifth-wheel," which is let into the upper face of the front axle and halved into the hounds I, as shown. To these hounds, which are provided with proper clips or other appliances for the purpose, the draft force is applied. The front axle is secured to the sway-bar G by means of the king-bolt J, which passes through such axle to such sway-bar. By means of this construction I am enabled to make a wagon of great strength, and at the same time much lighter and more easily handled than those constructed in the ordinary way.

What I claim as my invention is—

1. In combination with the bed of a wagon, the C-shaped bearing-bolster D, secured at each end to the side bars of the bed frame, the axle B, the braces $a$, the axle and bolster being secured together by means of the braces $b$, substantially as and for the purposes described.

2. In combination, the bed of a wagon, provided with the D-shaped bearing-frames F and sway-bar G, with the axle A, provided with the circle H and hounds I, the parts being constructed, arranged, and operating substantially as and for the purposes specified.

3. A wagon consisting of the axles A B, the bent bolsters D and F, sway-bar G, circle H, hounds I, and braces $a\ b\ d$, and bed-frame, the parts being constructed, arranged, and operating substantially as set forth.

JOSEPH MOSES.

Witnesses:
J. R. JOHNSON,
WM. E. JOHNSON.